United States Patent [19]

Steinkuhl

[11] 3,999,651
[45] Dec. 28, 1976

[54] CONVEYORS FOR USE IN MINING
[75] Inventor: Bernd Steinkuhl, Lunen, Germany
[73] Assignee: Gewerkschaft Eisenhutte Westphalia, Westfalia, Germany
[22] Filed: Oct. 23, 1975
[21] Appl. No.: 625,204

[30] Foreign Application Priority Data
  Dec. 19, 1974  Germany .......................... 2460176
[52] U.S. Cl. .............................. 198/861; 198/864; 198/735
[51] Int. Cl.² ......................................... B65G 19/28
[58] Field of Search .......... 198/204, 860, 861, 862, 198/864, 735; 299/43

[56] References Cited
UNITED STATES PATENTS

| 3,343,880 | 9/1967 | Hauschopp | 198/204 X |
| 3,367,718 | 2/1968 | Hauschopp | 198/204 X |
| 3,726,564 | 4/1973 | Hauschopp et al. | 198/204 X |
| 3,752,299 | 8/1973 | Blumenthal et al. | 198/204 |
| 3,770,321 | 11/1973 | Hauschopp | 198/204 X |
| 3,787,090 | 1/1974 | Hauschopp et al. | 299/43 |
| 3,788,458 | 1/1974 | Braun et al. | 198/204 |
| 3,822,011 | 7/1974 | Braun | 198/204 |
| 3,897,108 | 7/1975 | Krohm et al. | 299/43 |

FOREIGN PATENTS OR APPLICATIONS

| 1,397,053 | 3/1965 | France | 198/204 |
| 935,302 | 11/1955 | Germany | 198/204 |
| 848,177 | 9/1952 | Germany | 198/204 |
| 1,226,652 | 3/1971 | United Kingdom | 198/204 |
| 711,311 | 6/1954 | United Kingdom | 198/204 |
| 1,124,543 | 8/1968 | United Kingdom | 198/204 |

Primary Examiner—Robert W. Saifer
Assistant Examiner—Richard K. Thomson
Attorney, Agent, or Firm—Thompson, Birch, et al

[57] ABSTRACT

A scraper-chain conveyor is composed in known manner of a series of channel sections or pans arranged end-to-end and interconnected to restrain relative longitudinal displacement. Cover members and spacers are detachably secured to the side walls of the pans with the aid of bolts anchored to the pans so as to define upper and lower guide passages for a chain. The connection between the pans includes projections at the ends of the pans and conveniently provided on inserts on spill plates attached to the pans, which projections extend laterally outwards from the pan side walls. Oval links or loops are inserted onto the projections and are retained by the spacers which extend partly across the projections and the links when assembled.

9 Claims, 3 Drawing Figures

CONVEYORS FOR USE IN MINING

BACKGROUND OF THE INVENTION

The present invention relates to scraper-chain conveyors for use in mining.

It is well known to construct conveyors from a series of channel sections arranged end-to-end and to provide attachments at one or other side of these sections to produce chain guide passages through which a drive chain is circulated to propel a mining machine such as a plough. A scraper-chain assembly would be separately moved along the channel sections to convey material, e.g. coal. A variety of connection devices have been proposed and adopted in the past to secure the channel sections together. It is here usually desirable to utilize a form of device which will permit the channel sections to cant in respect of one another about their longitudinal centre axes whilst restraining movement along these axes. The connection devices must be strong enough to cope with the high forces produced during operation yet the devices should not interfere with other components or functions of the conveyor and its attachments. The connection devices which have been proposed or adopted in the past have usually involved some disadvantages. For example certain known connection devices need pins or screws to provided for their detachability and such items are apt to become corroded or jammed.

Known forms of connection device are described in German published Pat. Spec. Nos. 2201400, 2202399 and 2222081.

A general object of this invention is to provide an improved connection arrangement for the channel sections of a conveyor.

SUMMARY OF THE INVENTION

According to the present invention there is provided a conveyor for use in mining, said conveyor comprising a plurality of channel sections arranged end-to-end, spacers detachably mounted to the channel sections to separate upper and lower chain guide passages at one side thereof and means for connecting the channel sections together, said connecting means comprising lateral projections at the adjacent ends of the channel sections and locking elements inserted onto the projections wherein the spacers or parts attached thereto extend over the locking elements to retain the elements on the projections.

The locking elements are preferably loops of material, such as oval chain links, placed over the projections at the ends of adjacent channel sections to provide the desired mobility and the desired restraint on longitudinal displacement. The projections can have grooves to positively locate the locking elements thereon. Although the spacers and guide passages would normally be located on the goaf or stowage side it is feasible for these items to be on the opposite, i.e. the mineral face, side.

In contrast to the prior art the spacers serve to retain the connecting means in position and the need for pins or screws or the like is precluded. The spacers are, in turn, detachable from the channel sections and preferably threaded members or bolts as known per se are used to secure the spacers to the channel sections. The projections preferably lie more or less in the same horizontal plane as the spacers and more preferably are slightly offset vertically above the centre of the spacers.

Although it is possible to avoid the use of special constructional forms for the spacers these can be provided with recesses at their ends so that part of at least the projection and preferably also the locking elements are located within these recesses. The edges of the recesses can be shaped to conform with and partly surround the projections and the locking elements.

Preference is given to a composite constructional form for the spacers wherein each spacer is formed from two longitudinal strips interconnected by spaced-apart crosspieces and converging at their ends to extend over the locking elements.

Where the spacers are disposed on the goaf side spill plates known per se, can be secured to the channel sections, conveniently with the same threaded members securing the spacers. U-shaped covers can also be employed to laterally define the guide passages and the threaded members can also locate and secure these covers. Where spill plates are used, the projections can be affixed to the spill plates and in a preferred construction inserts are welded into ends of the spill plates and are provided with the projections formed integrally therewith.

Deflectors or guides can be formed on the projections or affixed thereto and these components serve to deflect or guide a drive chain disposed in the guide passages onto the spacers and away from the projections and locking elements. The deflectors or guides can be provided on the upper side of the projections only so as to deflect or guide the chain run in the upper guide passage.

In order to take up tensile forces during use and to preclude damage of the threaded members the spill plates or their inserts can have lugs which engage on attachments on the channel sections used primarily to locate and retain the heads of the threaded members.

The invention may be understood more readily, and various other features of the invention may become apparent from consideration of the following description.

BRIEF DESCRIPTION OF DRAWINGS

A constructional embodiment of the invention will now be described, by way of example only, with reference to the accompanying drawings, wherein.

DESCRIPTION OF PREFERRED EMBODIMENT

Figure 2:
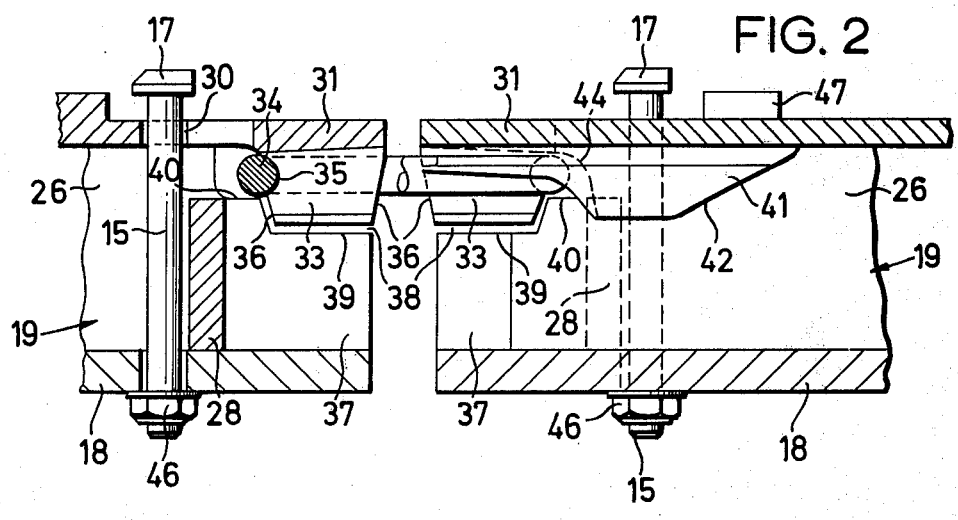
FIG. 2 is a sectional plan view of part of the conveyor shown in FIG. 1, the view being taken along the line II — II of FIG. 1.
Figure 3:
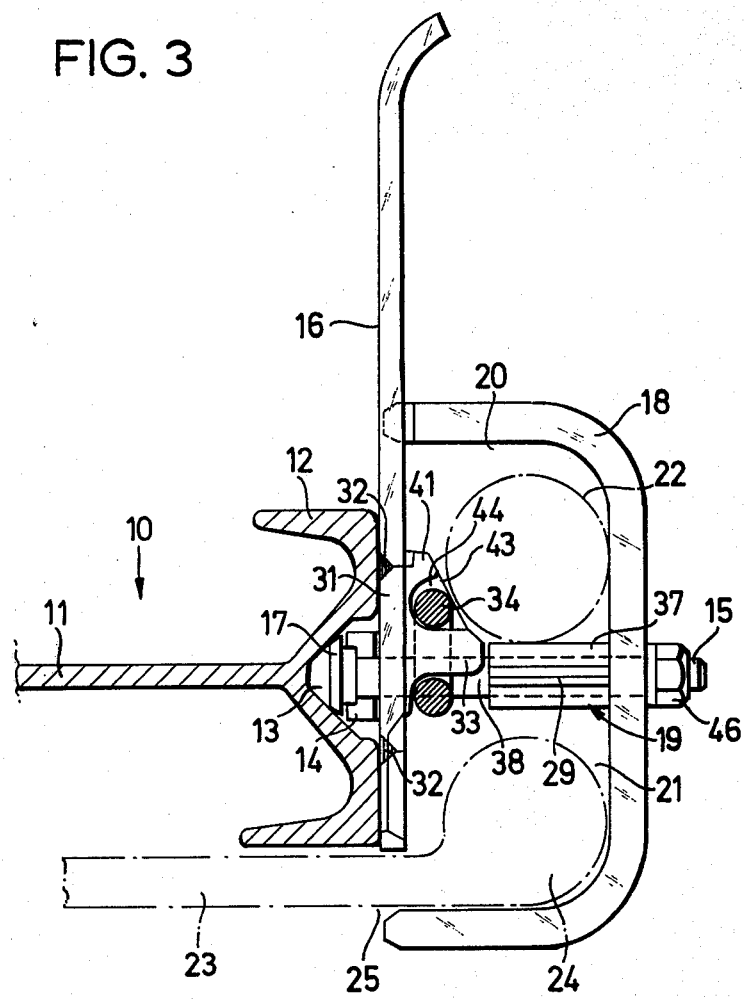
FIG. 3 is a part sectional end view of part of the conveyor shown in FIG. 1, the view being taken along the line III — III of FIG. 1.

As generally shown in the drawings, and referring initially particularly to FIG. 3 which shows the goaf side of the conveyor, the scraper chain conveyor is composed in known manner of a series of separate channel sections or pans 10 arranged end-to-end. Each channel section 10 is constructed from two generally sigma-shaped side walls adjoined, as by welding, to a floor plate 11. Only one of the walls is shown in FIG. 3. A scraper-chain assembly (not shown) would be moved along the chanel sections 10 to convey material over the floor plates 11. Each side wall has a centrallylocated V-shaped recess 13 at its outer side and each recess 13 has its apex aligned with the floor plate 11 which also corresponds with a horizontal central plane of the channel section 10. Attachments 14 are welded into the recesses 13 and serve to locate and retain the heads 17 of threaded members or bolts 15. These members 15 serve inter alia to mount, at least on the goaf side of the conveyor, spill plates 16 which project upwardly beyond the upper flanges 12 of the side walls of the channel sections 10 to thereby increase the carrying capacity of the conveyor in known manner. Still referring particularly to FIG. 3, the threaded members 15, which project through bores 30 (FIGS. 1 and 2) in the spill plates 16, also serve to mount U-shaped covers 18 and spacer members 19 to the goaf side of the conveyor. Nuts 46 and washers are screwed on the outer ends of the members 15 which project through slots in the covers 18 (FIG. 1) so as to clamp the structures 10,16 19 and 18 together.

The covers 18 and the spacers 19 define, in known manner, upper and lower chain guide passages 20, 21 respectively, which receive a drive chain (not shown) circulated therealong. This drive chain serves to propel a mining machine, more usually a plough, along the conveyor and in this embodiment a plough sword plate 23 extends beneath the conveyor and projects through a gap 25 between the lower flanges of the side walls of the conveyor channel section 10 and the lower portions of the covers 18. A driving connection, which also serves as a guide means, is established between the sword plate 23 and the lower run of the drive chain in the passage 21 and is generally designated 24 in FIG. 3.

In the construction described so far each conveyor channel section 10 would have allocated to it two covers 18 and two spacers 19 with the length of each cover 18 and spacer 19 being substantially one half of the length of the channel section 10. In contrast a single spill plate 16 can be allocated to each channel section.

Figure 1:
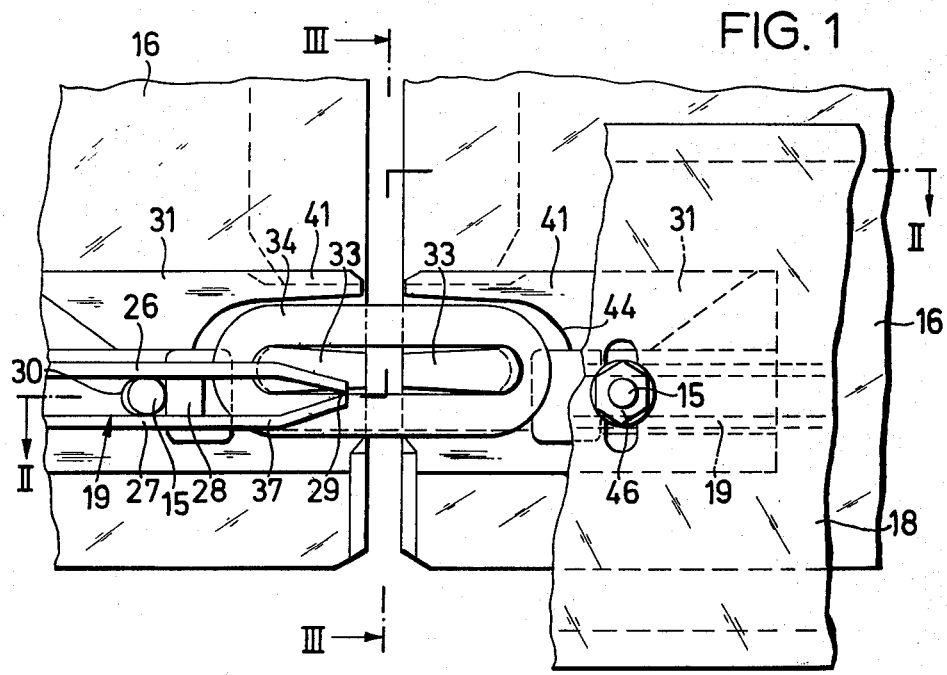
FIG. 1 is a schematic side view of part of a scraper chain conveyor made in accordance with the invention and as viewed from the goaf or stowage side of a mine working.

As shown in FIG. 1, each spacer 19 is of composite construction with two longitudinal metal strips 26, 27 arranged symmetrically of the central plane and welded together at their converging ends 29. Cross pieces 28 are in turn welded between the strips 26, 27 and the members 15 extend through the gaps between the strips 26, 27 and the cross pieces 28. This form of construction enables the spacers 19 to be inverted and used with either strip 26, 27 upper most.

In order to connect the adjacent ends of the channel sections 10 together, use is made of a connection arrangement which will now be described.

Each spill plate 16 has a rectangular cut-out portion at its outer end, i.e. facing one of the ends of the associated conveyors channels section 10. An insert 31 has a planar portion of rectangular shape located in the cut-out of each of the spill plates 16 and welded to the margins of the cut-out portion along seams 32. This planar portion of each insert 31 is provided with a bore 30 for receiving one of the threaded members 15. Each insert 31 also has a spigot projection 33 extending normally to its planar portion and to the associated plate 16 and into the space within the associated cover 18. This projection 33 is vertically offset above the horizontal central plane of the conveyor i.e. above the centre of the spacers 19 and in the direction of the chain guide passage 20. Deflectors or guides 41, explained and described in more detail hereinafter, are provided on the upper side of the porjections 33. The projections 33 of adjacent channel sections 10 are aligned on a common horizontal plane and are spaced apart by a small distance. To secure the channel sections together a locking element 34, conveniently in the form of a closed loop such as an oval chain link is placed onto the projections 33. As can be appreciated this form of connection restricts longitudinal displacement of one channel section 10 relative to the next but permits a certain degree of mobility in other directions, principally vertically, as is usually desirable. The projections 33 of the inserts 31 are preferably slightly tapered (FIG. 1) in the vertical sense to narrow in width in the direction of the next adjacent channel section 10 and the shallow grooves 35 are provided in the remote end faces 36 of the projections 33 to receive and positively locate the locking element 34. Also each projection 33 has tapered end faces 36 which converge in the outward direction, as shown in FIG. 2.

Each insert 31 composed of the planar portion, the projection 33 and its deflector or guide 41 can be best fabricated by casting or forging.

In order to retain the elements 34 on the projections 33 the spacers 19 are provided with attachments or integral extensions or end portions 37 which, as shown in FIG. 2, project laterally over the locking elemets 34 and the projections 33. In manufacture, the strips 26, 27 of each spacer 19 can merely be prolonged to form the extensions 37 and provided with rear recesses 38 receiving the projections 33. The inside edges 39, 40 of the recesses 38 of the strips 26, 27 are preferably offset laterally as shown in FIG. 2 and joined by a tapered face matching the end face 36 of the associated projection 33 so that overall the shape of the recesses 38 conforms to the projections 33.

The deflectors or guides 41 provided on the upper sides of the projections 33 are shaped as shown in the drawings and serve inter alia to restrain excess vertical movement of the associated locking element 34 by means of a hook like component 44 projecting over the latter and shielding its top and outer ends. The deflectors or guides 41, which project partly into the upper guide passage 20 have inclined faces 42, 43 (FIGS. 2 and 3) the latter of which merges smoothly with a chamfered upper lateral end part of the projection 33 itself. The faces 42, 43 serve to guide or deflect the drive chain moving within the guide passages 20, 21. More particularly, the faces 42 of each deflector or guide 41 extends substantially horizontally whereas the face 43 extends substantially vertically and the combined effect of these faces 42, 43 is to deflect or guide the upper chain run outwardly and downwardly towards the spacer 19 thereby preventing the chain engaging on the projections 33 or the elements 34. It is possible to also provide similar deflectors or guides at the lower sides of the projections 33.

The spill plate 16 or the inserts 31 have lugs 47 formed integrally therewith or affixed thereto at the inner side, i.e. remote from the passages 20, 21. These lugs or stops 47 engage on the attachments 44 in the recess 13 of the channel section side wall. These lugs 47 are advantageous during operation in transmitting tensile forces from one channel section 10 to the next and such forces pass through the associated spill plates 16, the projections 33 and the locking element 34 so that the members 15 are effectively protected from damage.

Although the connections between the conveyor channel sections thus described have been shown on the stowage or goaf side it is feasible to utilize such connections on the other, e.g. mineral face, side. However, it is also possible to use other known forms of connectors at the other side. It is also feasible to use a combination of conventional connectors with the connections as described either permanently or while the conveyor is being assembled.

I claim:

1. In a conveyor for use in mining; said conveyor comprising a plurality of channel sections arranged end-to-end along which material can be conveyed, each channel section having side walls adjoined by a floor plate; U-shaped covers mounted on one common external side of the channel sections; spacers disposed within the covers and detachably mounted on said one common side to separate the space within the covers into upper and lower chain guide passages; the improvements comprising spill plates carrying spigot projections detachably secured to said one common side of the channel sections, the spigot projections being disposed at the ends of each channel section and extending outwardly therefrom in the direction of the chain guide passages, locking elements of loop form inserted onto the spigot projections at adjacent ends of the channel sections to restrain relative longitudinal displacement therebetween and recesses formed at the ends of the spacers to receive the spigot projections and locking elements with the spacers extending partly across the locking elements to retain the locking elements on the projections.

2. A conveyor according to claim 1, wherein a drive chain is mounted to move along the guide passages and there are provided deflector guides disposed at least at the upper sides of the projections and serving to deflect and guide the chain onto the spacers and away from the projections and locking elements.

3. A conveyor according to claim 1, wherein spill plates are detachably secured to the channel sections with the aid of threaded members which serve to also secure the covers and the spacers to the channel sections, and wherein the projections are formed integrally with planar portions of inserts welded to the spill plates, the planar portions having bores for receiving said threaded members.

4. A conveyor according to claim 3, wherein attachments are welded to the channel sections to locate and retain the heads of the threaded members and wherein lugs rigidly secured to the spill plates engage on the attachments and which serve to transmit tensile forces thereto during operation.

5. A conveyor according to claim 1, wherein each spacer is formed from two longitudinal strips interconnected by spaced-apart cross pieces and converging at their ends to extend over the locking elements.

6. A conveyor according to claim 1, wherein the locking elements are in the form of oval chain links and the projections have grooves for receiving and locating the locking elements.

7. A conveyor according to claim 1, wherein the recesses of the spacers have inner edges shaped to conform with and partly surround the projections and locking elements.

8. A conveyor according to claim 1, wherein the spigot projections are formed by inserts welded into the spill plates.

9. In or for a conveyor of the type composed of serially disposed separate pans each with side walls adjoined by a floor plate, U-shaped covers and spacers detachably mounted on common side walls of the pans to define upper and lower chain guide passages separated by the spacers and spill plates mounted to the common side walls of the pans, an improved connection arrangement for interconnecting the pans which comprises spigot projections formed integrally with inserts welded into the spill plates at the ends of the pans and extending in the direction of the guide passages, ring-like locking elements detachably fitted over the spigot projections at adjacent ends of the pans and extensions at the ends of the spacers defined at the inner side by recesses accommodating part of the projections and their locking elements which extension project over the locking elements to prevent the latter from becoming detached from the spigot projections.

* * * * *